US012712282B2

(12) United States Patent
Ghate et al.

(10) Patent No.: US 12,712,282 B2
(45) Date of Patent: Aug. 18, 2026

(54) FLEXIBLE, RADIO-FREQUENCY TRANSITIONS AND ELECTRONIC SYSTEMS THAT INCLUDE THE FLEXIBLE, RADIO-FREQUENCY TRANSITIONS

(71) Applicant: FormFactor, Inc., Livermore, CA (US)

(72) Inventors: Pratik Bakul Ghate, Beaverton, OR (US); Ernest Gammon McReynolds, Beaverton, OR (US); Shean Thomas McMahon, Seal Beach, CA (US); Timothy E. Lesher, Beaverton, OR (US); Bryan Willis, Beaverton, OR (US)

(73) Assignee: FormFactor, Inc., Livermore, CA (US)

( * ) Notice: Subject to any disclaimer, the term of this patent is extended or adjusted under 35 U.S.C. 154(b) by 247 days.

(21) Appl. No.: 18/649,797

(22) Filed: Apr. 29, 2024

(65) Prior Publication Data

US 2024/0396221 A1 Nov. 28, 2024

Related U.S. Application Data

(60) Provisional application No. 63/468,141, filed on May 22, 2023.

(51) Int. Cl.
*H01Q 13/20* (2006.01)
*H01Q 1/42* (2006.01)
*H01Q 13/26* (2006.01)

(52) U.S. Cl.
CPC .......... *H01Q 13/206* (2013.01); *H01Q 13/26* (2013.01); *H01Q 1/427* (2013.01)

(58) Field of Classification Search
CPC combination set(s) only.
See application file for complete search history.

(56) References Cited

U.S. PATENT DOCUMENTS 3,781,681 A 12/1973 Wagner et al.
4,001,685 A 1/1977 Roch
(Continued)

FOREIGN PATENT DOCUMENTS

EP 0298219 A2 1/1989
JP 2004-171905 A 6/2004
WO WO 2012061568 A2 10/2012

*Primary Examiner* — Dimary S Lopez Cruz
*Assistant Examiner* — Brandon Sean Woods
(74) *Attorney, Agent, or Firm* — KOLITCH ROMANO DASCENZO GATES LLP

(57) ABSTRACT

Flexible, radio-frequency transitions and electronic systems that include the flexible, radio-frequency transitions are disclosed herein. The flexible, radio-frequency transitions are configured to electrically interconnect a first electronic component and a second electronic component to facilitate radio-frequency electrical communication therebetween and include a flexible dielectric membrane and a microstrip transmission line. The microstrip transmission line is formed on the flexible dielectric membrane and includes an electrically conductive signal trace and an electrically conductive ground plane for the electrically conductive signal trace. The transition is configured to electrically interconnect the first electronic component and the second electronic component, and to permit radio-frequency electrical communication therebetween, throughout a range of transition angles. The electronic systems utilize radio-frequency communication and include the first electronic component, the second electronic component, and the transitions.

24 Claims, 16 Drawing Sheets

(56) References Cited

U.S. PATENT DOCUMENTS

| | | | |
|---|---|---|---|
| 5,101,453 | A | 3/1992 | Rumbaugh |
| 5,507,652 | A | 4/1996 | Wardwell |
| 5,529,504 | A | 6/1996 | Greenstein |
| 5,914,613 | A | 6/1999 | Gleason |
| 6,036,502 | A | 3/2000 | Neidich |
| 6,071,009 | A | 6/2000 | Clyne |
| 6,156,484 | A | 12/2000 | Bassous et al. |
| 6,256,882 | B1 | 7/2001 | Gleason |
| 6,305,230 | B1 | 10/2001 | Kasukabe et al. |
| 6,441,315 | B1 | 8/2002 | Eldridge et al. |
| 6,617,863 | B1 | 9/2003 | Kasukabe |
| 6,842,023 | B2 | 1/2005 | Yoshida et al. |
| 7,178,711 | B2 | 2/2007 | Wong et al. |
| 7,182,672 | B2 | 2/2007 | Tunaboylu et al. |
| 7,190,181 | B2 | 3/2007 | Peters et al. |
| 7,218,131 | B2 | 5/2007 | Tanioka et al. |
| 7,368,925 | B2 | 5/2008 | Navratil et al. |
| 7,368,927 | B2 | 5/2008 | Smith |
| 7,550,983 | B2 | 6/2009 | Gleason et al. |
| 7,557,596 | B2 | 7/2009 | Eldridge et al. |
| 7,688,089 | B2 | 3/2010 | Audette |
| 7,862,391 | B2 | 1/2011 | Johnston et al. |
| 7,888,957 | B2 | 2/2011 | Smith et al. |
| 7,893,704 | B2 | 2/2011 | Gleason et al. |
| 9,244,099 | B2 | 1/2016 | Duckworth et al. |
| 2001/0009061 | A1 | 7/2001 | Gleason |
| 2003/0041443 | A1 | 3/2003 | Stevenson et al. |
| 2003/0082835 | A1 | 5/2003 | McChesney |
| 2003/0107388 | A1 | 6/2003 | Reed et al. |
| 2004/0223309 | A1 | 11/2004 | Haemer |
| 2005/0099763 | A1 | 5/2005 | Rathburn |
| 2005/0189958 | A1 | 9/2005 | Chen |
| 2005/0218429 | A1 | 10/2005 | Mazza |
| 2006/0241891 | A1 | 10/2006 | Kaushal |
| 2007/0178727 | A1 | 8/2007 | Igarashi |
| 2008/0054918 | A1 | 3/2008 | Lin et al. |
| 2008/0061808 | A1 | 3/2008 | Mok |
| 2008/0293277 | A1 | 11/2008 | Kumar et al. |
| 2009/0212795 | A1 | 8/2009 | Williams |
| 2009/0214935 | A1 | 8/2009 | Berman |
| 2010/0127725 | A1 | 5/2010 | Smith |
| 2010/0237889 | A1 | 9/2010 | Desta et al. |
| 2010/0253374 | A1 | 10/2010 | Chen et al. |
| 2010/0271062 | A1 | 10/2010 | Breinlinger et al. |
| 2011/0115578 | A1 | 5/2011 | Quan et al. |
| 2011/0121922 | A1* | 5/2011 | Blair ......................... H01P 3/08 333/238 |
| 2015/0068796 | A1 | 3/2015 | Jung et al. |

* cited by examiner

FLEXIBLE, RADIO-FREQUENCY TRANSITIONS AND ELECTRONIC SYSTEMS THAT INCLUDE THE FLEXIBLE, RADIO-FREQUENCY TRANSITIONS

RELATED APPLICATION

This application claims priority to U.S. Provisional Patent Application No. 63/468,141, which was filed on May 22, 2023, and the complete disclosure of which is hereby incorporated by reference.

FIELD OF THE DISCLOSURE

The present disclosure relates generally to flexible, radio-frequency transitions and to electronic systems that include the flexible, radio-frequency transitions.

BACKGROUND OF THE DISCLOSURE

The complexity of printed circuit boards is increasing dramatically. This increase in complexity is caused by a variety of factors, including higher frequency, higher bandwidth, and/or component miniaturization. With this increasing complexity, it has become difficult to manufacture a printed circuit board with a desired number, density, and position of included signal traces; however, no viable alternative currently exists. As such, printed circuit board manufacturers are forced to make trade-offs between signal quality and signal density. These challenges are expected only to increase in the future. Thus, there exists a need for improved flexible, radio-frequency transitions and/or for electronic systems that include the flexible, radio-frequency transitions.

SUMMARY OF THE DISCLOSURE

Flexible, radio-frequency transitions and electronic systems that include the flexible, radio-frequency transitions are disclosed herein. The flexible, radio-frequency transitions are configured to electrically interconnect a first electronic component and a second electronic component to facilitate radio-frequency electrical communication therebetween. The flexible, radio-frequency transitions include a flexible dielectric membrane and a microstrip transmission line. The microstrip transmission line is formed on the flexible dielectric membrane and includes an electrically conductive signal trace and an electrically conductive ground plane for the electrically conductive signal trace. The transition is configured to electrically interconnect the first electronic component and the second electronic component and to permit radio-frequency electrical communication therebetween, throughout a range of transition angles.

The electronic systems utilize radio-frequency communication and include the first electronic component, the second electronic component, and the transitions. The electrically conductive signal trace electrically interconnects the first electronic component and the second electronic component and is configured to convey a radio-frequency signal between the first electronic component and the second electronic component.

DETAILED DESCRIPTION AND BEST MODE OF THE DISCLOSURE

Figure 1:
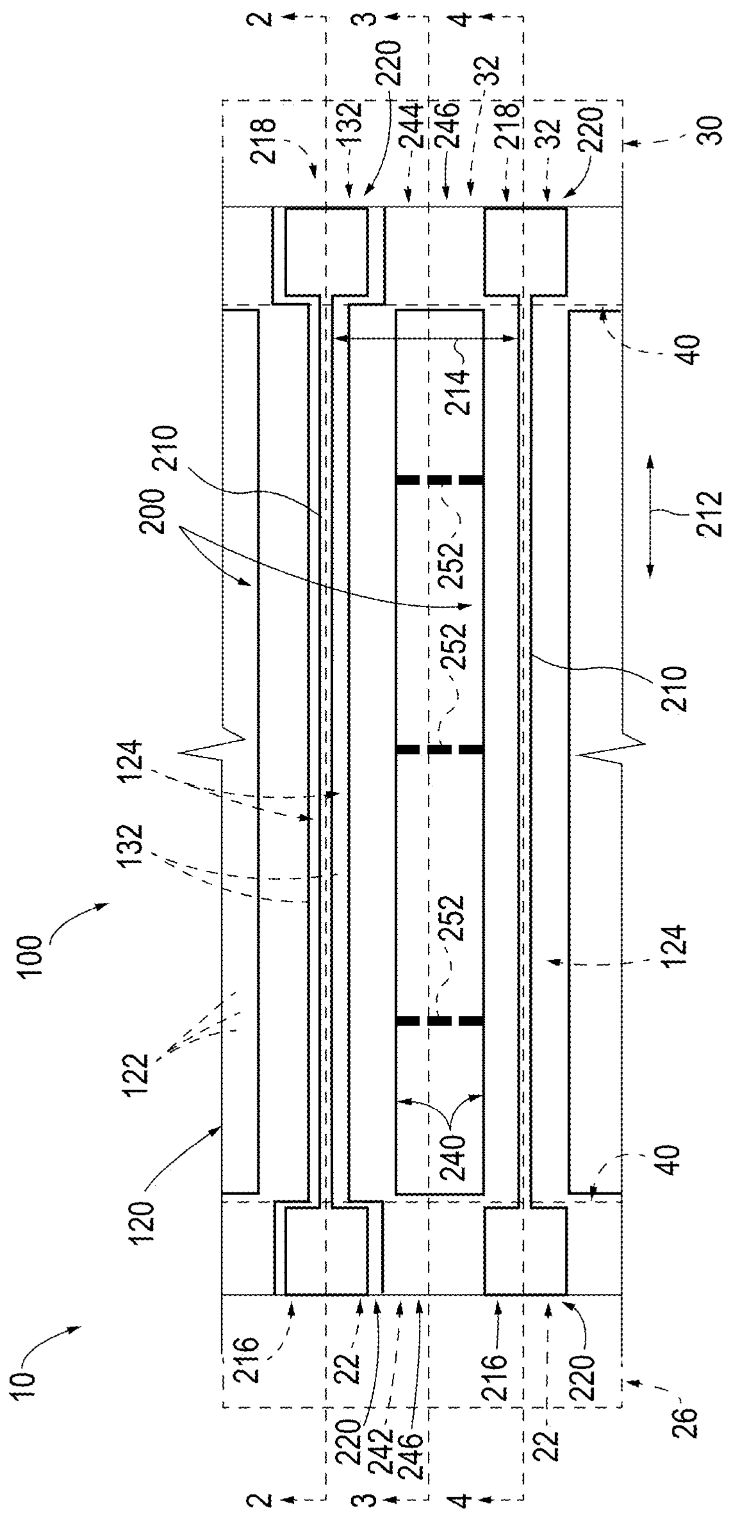
FIG. 1 is a schematic illustration of examples of flexible, radio-frequency transitions that may be included in electronic systems, according to the present disclosure.

FIGS. 1-21 provide examples of flexible, radio-frequency transitions 100 and/or of electronic systems 10 that include flexible, radio-frequency transitions 100, according to the present disclosure. Elements that serve a similar, or at least substantially similar, purpose are labeled with like numbers in each of FIGS. 1-21, and these elements may not be discussed in detail herein with reference to each of FIGS. 1-21. Similarly, all elements may not be labeled in each of FIGS. 1-21, but reference numerals associated therewith may be utilized herein for consistency. Elements, components, and/or features that are discussed herein with reference to one or more of FIGS. 1-21 may be included in and/or utilized with any of FIGS. 1-21 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

As collectively illustrated by FIGS. 1-21, flexible, radio-frequency transitions 100 also may be referred to herein as transitions 100, interconnects 100, and/or electrical interconnects 100. Transitions 100 may be configured to interconnect a first electronic component 20 and a second electronic component 30, such as to facilitate radio-frequency (RF) electrical communication therebetween. In such a configuration, and as discussed in more detail herein, transitions 100, first electronic component 20, and second electronic component 30 may at least partially form and/or define an electronic system 10. Transitions 100 include a flexible dielectric membrane 120 and a microstrip transmission line 200. Microstrip transmission line 200 includes an electrically conductive signal trace 210 and an electrically conductive ground plane 240 for electrically conductive signal trace 210.

Flexible dielectric membrane 120 may include any suitable structure that is flexible, that supports microstrip transmission line 200, and/or upon which microstrip transmission line 200 (including electrically conductive signal trace 210 and electrically conductive ground plane 240 thereof) may be formed and/or defined. Examples of flexible dielectric membrane 120, which also may be referred to herein as a membrane 120, include a flexible polymeric membrane and/or a flexible polyimide membrane. In some examples, and as discussed in more detail herein, flexible dielectric membrane 120 may include and/or may be defined by a plurality of membrane layers 122, examples of which are illustrated in FIGS. 1-4 and 8-9.

Transitions 100 may be configured such that an electrically insulating region 124 of membrane 120 may extend between electrically conductive signal trace 210 and electrically conductive ground plane 240 and/or may electrically isolate the electrically conductive signal trace and the electrically conductive ground plane from one another. This may be accomplished in any suitable manner.

As an example, and as illustrated in the top-most example of microstrip transmission line 200 that is illustrated in FIG. 1, electrically insulating region 124 may include and/or be an insulating membrane region 132, which may be defined on a surface of flexible dielectric membrane 120 and/or on a surface of a membrane layer 122 thereof. Stated differently, and in such examples, electrically conductive signal trace 210 and electrically conductive ground plane 240 may be formed and/or defined on the surface, or on the same surface, of flexible dielectric membrane 120 and/or of membrane layer 122. Additionally or alternatively, electrically conductive signal trace 210 and electrically conductive ground plane 240 may be spaced apart from one another, on the surface of flexible dielectric membrane 120 and/or membrane layer 122, via electrically insulating region 124.

Figure 4:
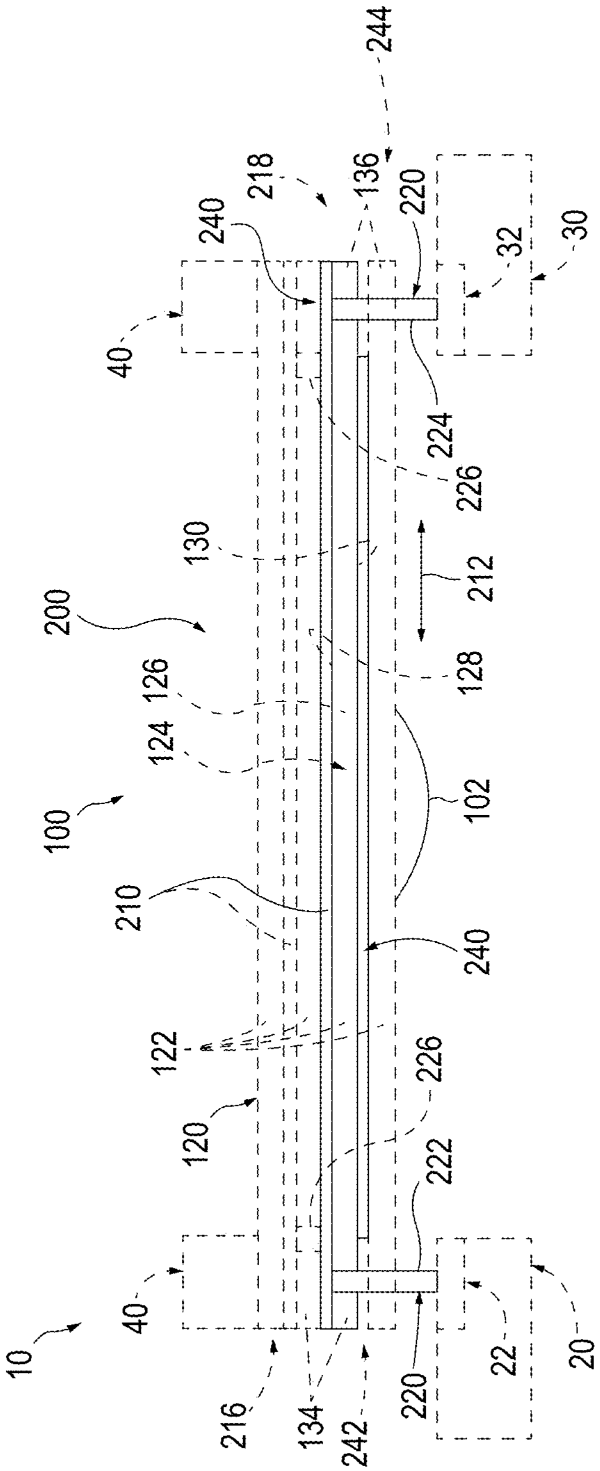
FIG. 4 is a schematic cross-sectional view of the flexible, radio-frequency transition of FIG. 1 taken along line 4-4 of FIG. 1.
Figure 5:
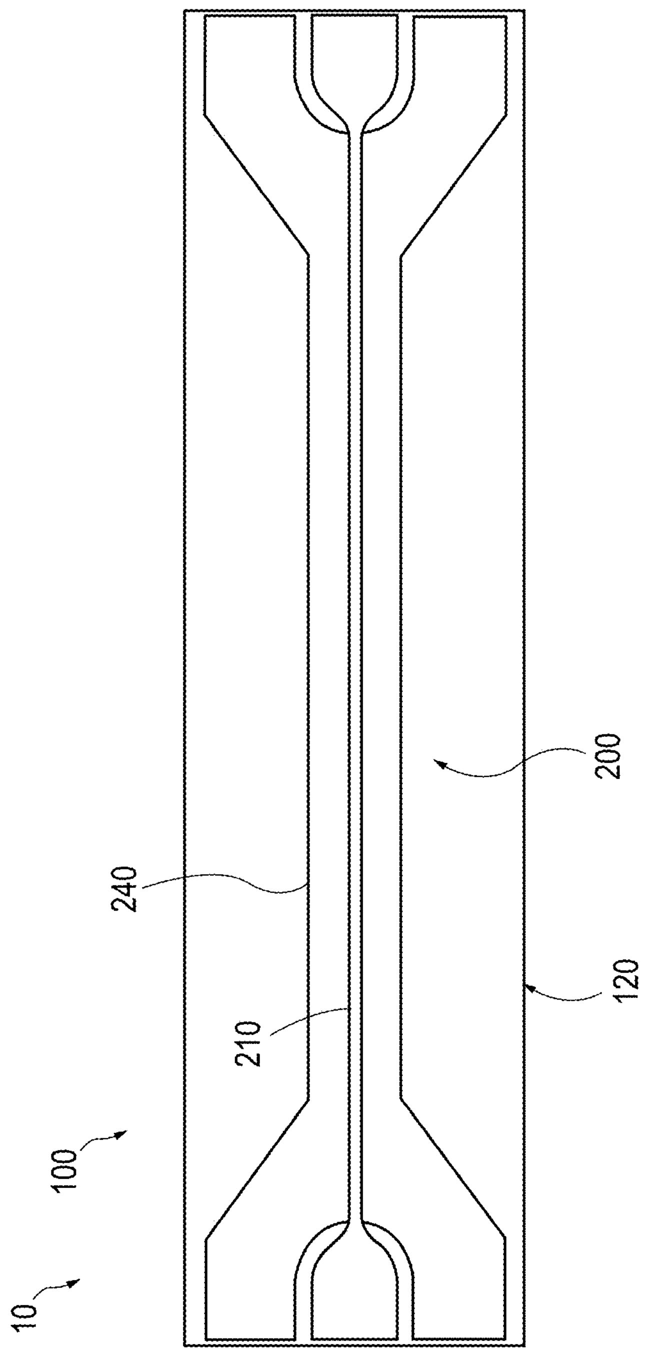
FIG. 5 is a schematic top view illustrating an example of a flexible, radio-frequency transition according to the present disclosure.

As another example, and as illustrated in the bottom-most example of microstrip transmission line 200 that is illustrated in FIG. 1 in conjunction with the cross-sectional view of FIG. 4, electrically insulating region 124 may include an insulating membrane layer 126. In such examples, and as illustrated in FIG. 4, electrically conductive signal trace 210 may be formed on a trace side 128 of insulating membrane layer 126, and electrically conductive ground plane 240 may be formed on a plane side 130 of the insulating membrane layer.

Figure 2:
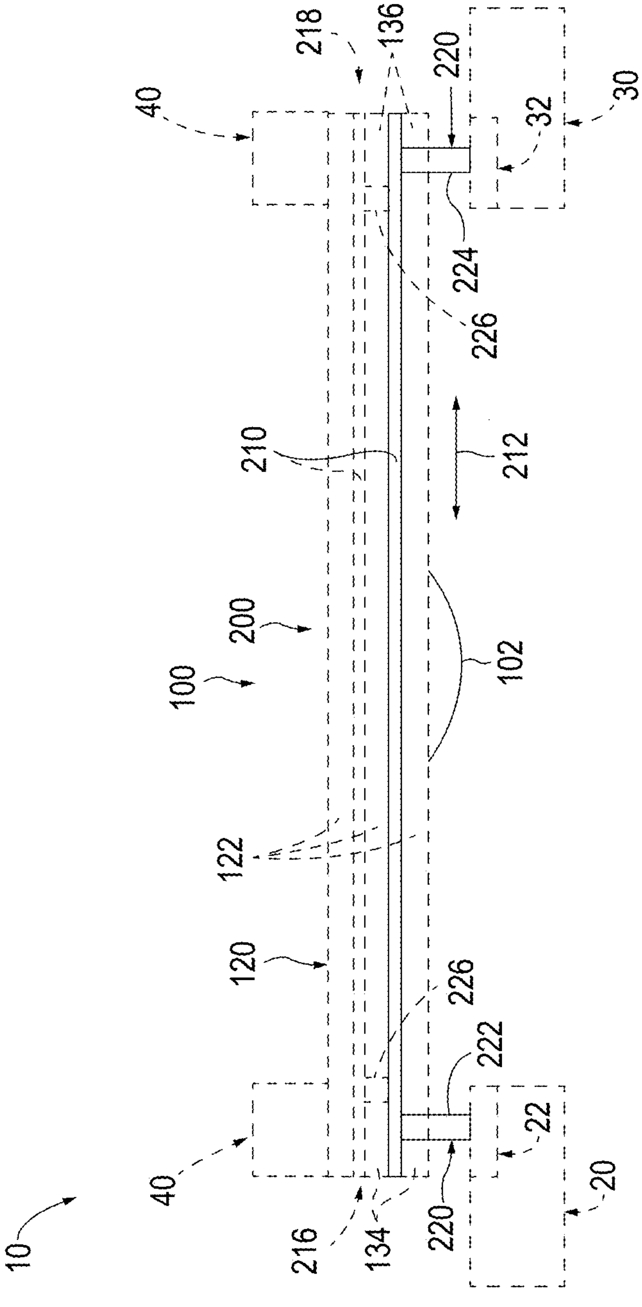
FIG. 2 is a schematic cross-sectional view of the flexible, radio-frequency transition of FIG. 1 taken along line 2-2 of FIG. 1.
Figure 3:
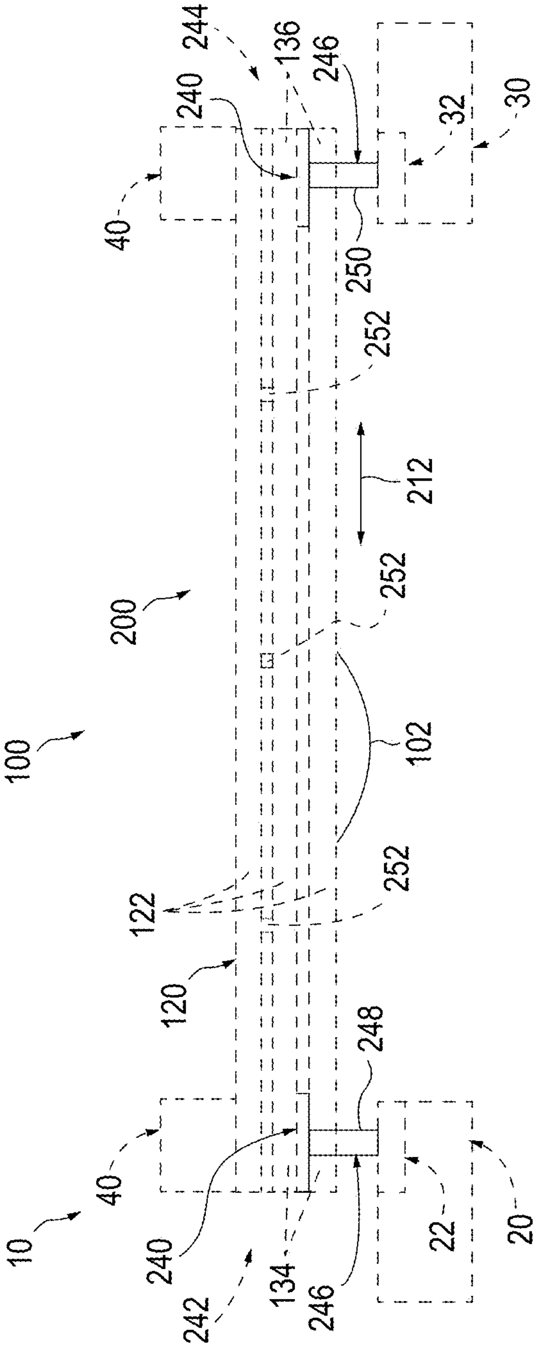
FIG. 3 is a schematic cross-sectional view of the flexible, radio-frequency transition of FIG. 1 taken along line 3-3 of FIG. 1.

As discussed, flexible dielectric membrane 120 may include the plurality of membrane layers 122. In such examples, electrically conductive signal trace 210 may be positioned and/or defined between two adjacent trace-supporting membrane layers 134, as illustrated in FIGS. 2-4. Similarly, electrically conductive ground plane 240 may be positioned and/or defined between two adjacent plane-supporting membrane layers 136. Stated differently, electrically conductive signal trace 210 may be at least partially, or even completely, encapsulated between and/or surrounded by trace-supporting membrane layers 134. Additionally or alternatively, electrically conductive ground plane 240 may be at least partially, or even completely, encapsulated between and/or surrounded by plane-supporting membrane layers 136. In some examples, and as illustrated in FIGS. 2-3, trace-supporting membrane layers 134 also may be plane-supporting membrane layers 136. Alternatively, and as illustrated in FIG. 4, at least one trace-supporting membrane layer 134 may differ from at least one plane-supporting membrane layer 136.

Microstrip transmission line 200 may include and/or be any suitable structure that includes electrically conductive signal trace 210 and/or that includes electrically conductive ground plane 240. In some examples, microstrip transmission line 200 may be configured to convey a high-frequency electrical signal along a signal conduction axis 212, as illustrated in FIGS. 1-4. Signal conduction axis 212 may extend parallel to, may extend along, and/or also may be referred to herein as an elongate axis of microstrip transmission line 200, of electrically conductive signal trace 210, and/or of electrically conductive ground plane 240.

It is within the scope of the present disclosure that microstrip transmission line 200 may be an elongate microstrip transmission line. With this in mind, a ratio of a length of microstrip transmission line 200 to a width of the microstrip transmission line, a ratio of a length of electrically conductive signal trace 210 to a width of the electrically conductive signal trace, and/or a ratio of a length of electrically conductive ground plane 240 to a width of the electrically conductive ground plane may be greater than 1. Examples of such ratios include ratios of at least 5, at least 10, at least 25, at least 50, at least 100, at least 250, at least 500, at least 1,000, at most 25,000, at most 10,000, at most 5,000, and/or at most 1,000.

Microstrip transmission line 200 may be formed from and/or defined by any suitable material and/or materials. As examples, electrically conductive signal trace 210 may be formed from and/or defined by an electrically conductive trace material, a metallic trace material, aluminum, and/or copper. As additional examples, electrically conductive ground plane 240 may be formed from and/or defined by an electrically conductive plane material, a metallic plane material, aluminum, and/or copper.

As discussed, transitions 100 are flexible. With this in mind, transitions 100 may be configured to be bent, or to bend, without impairing the ability of transitions 100 to provide the radio-frequency electrical communication and/or other functionality disclosed herein. Stated differently, transitions 100 may be configured to electrically interconnect first electronic component 20 and the second electronic component 30, and to permit radio-frequency electrical communication therebetween, throughout a range of transition angles, as indicated at 102 in FIGS. 2-4 and 11-15. Stated still differently, a single transition 100 may be configured to bend and/or flex to any desired transition angle 102 within the range of transition angles. Examples of the range of transition angles include angles of at least 0 degrees, at least 5 degrees, at least 10 degrees, at least 15 degrees, at least 20 degrees, at least 30 degrees, at least 45 degrees, at least 90 degrees, at most 350 degrees, at most 340 degrees, at most 330 degrees, at most 320 degrees, at most 310 degrees, at most 300 degrees, at most 270 degrees, at most 240 degrees, at most 210 degrees, at most 180 degrees, at most 150 degrees, at most 120 degrees, and/or at most 90 degrees. As illustrated in FIGS. 1-4, transition angles 102 may be defined within a plane that extends parallel, or at least substantially parallel, to signal conduction axis 212. Additionally or alternatively, transition angles 102 may be defined within a plane that extends perpendicular, or at least substantially perpendicular, to the width of the microstrip transition line, the width of the electrically conductive ground plane, the width of the electrically conductive signal trace, trace side 128, and/or plane side 130.

Figure 14:
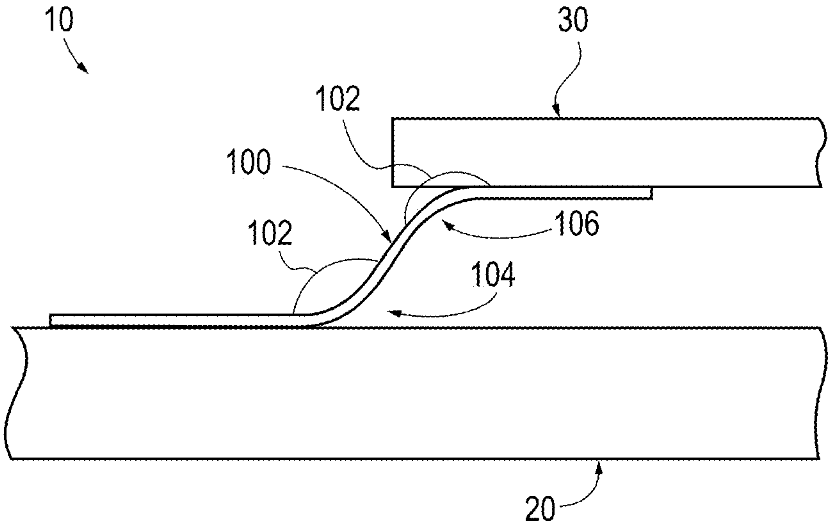
FIG. 14 illustrates an example of a transition angle for a flexible, radio-frequency transition according to the present disclosure.

Transitions 100 also may be configured to be bent and/or flexed such that a single transition 100 exhibits a plurality of transition angles, including at least a first transition angle 104 and a second transition angle 106, as illustrated in FIG. 14. Such configurations may provide improved spatial flexibility for positioning of first electronic component 20 and/or second electronic component 30. Such configurations may be referred to herein as S-shaped, at least partially S-shaped, sigmoidal, and/or at least partially sigmoidal configurations for transitions 100.

As illustrated in FIGS. 1-2, 4, and 7, transitions 100 may include an electrically conductive trace interface tip 220, which also may be referred to herein as a trace tip 220. Trace tip 220, when present, may extend from electrically conductive signal trace 210 and/or may be configured to form an electrical connection with first electronic component 20 and/or with second electronic component 30. As illustrated, trace tip 220 may extend perpendicular, or at least substantially perpendicular, to the elongate axis of microstrip transmission line 200 and/or electrically conductive signal trace 210. As also illustrated, trace tip 220 may extend through a corresponding region of flexible dielectric membrane 120 and/or of a membrane layer 122 thereof, thereby permitting and/or facilitating the electrical connection with the first electronic component and/or with the second electronic component.

Figure 7:
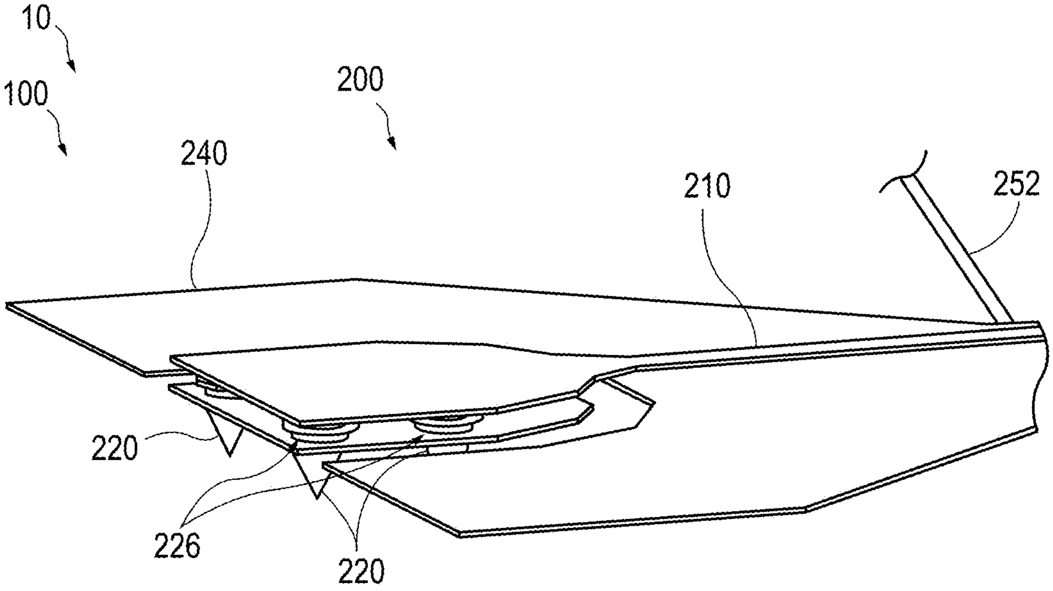
FIG. 7 is a schematic profile view illustrating an example of a region of a flexible, radio-frequency transition according to the present disclosure.
Figure 8:
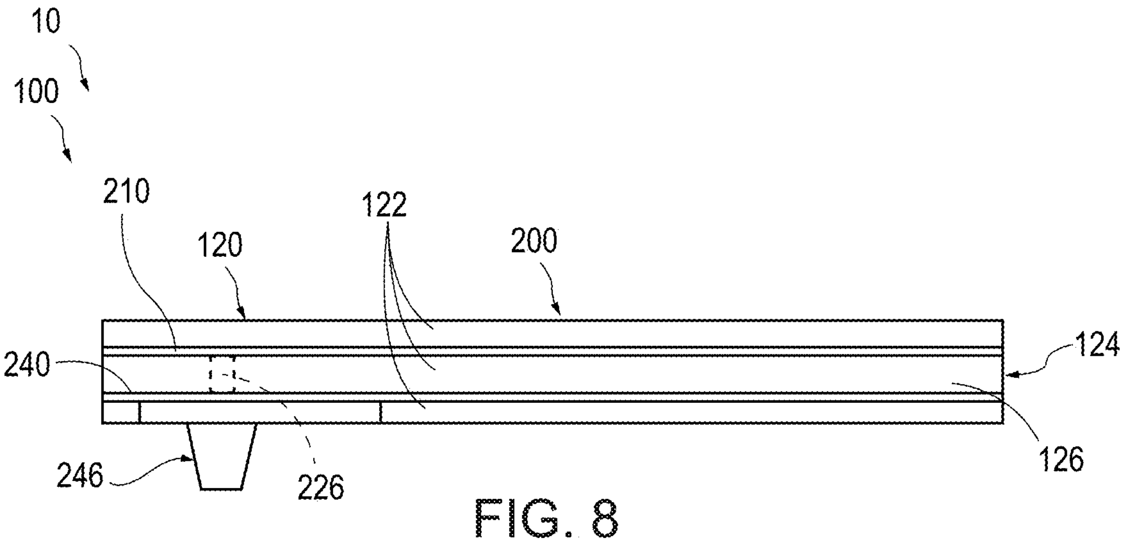
FIG. 8 is a schematic cross-sectional view illustrating an example of a region of a flexible, radio-frequency transition according to the present disclosure.
Figure 9:
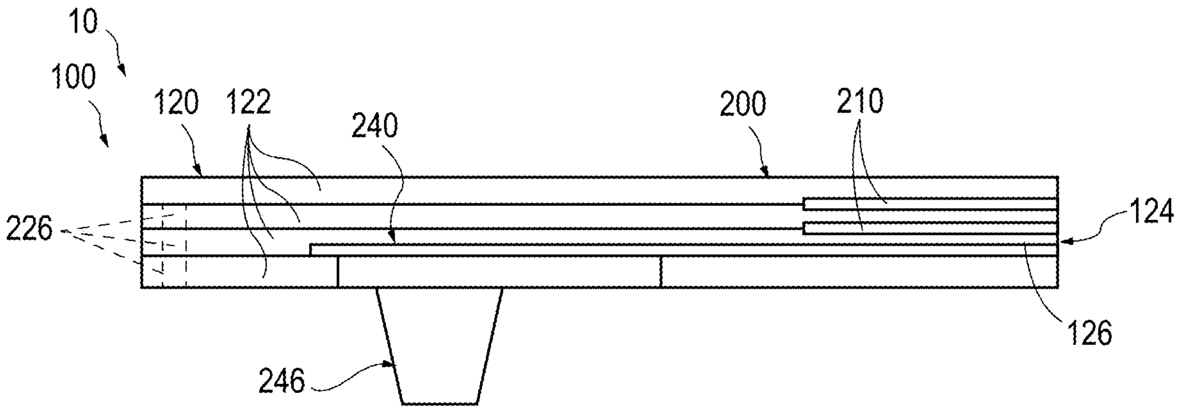
FIG. 9 is a schematic cross-sectional view illustrating an example of a region of a flexible, radio-frequency transition according to the present disclosure.

It is within the scope of the present disclosure that transitions 100 may include a plurality of trace tips 220. As an example, and as illustrated in FIG. 7, the plurality of trace tips 220 may extend from and/or provide electrical communication with a single electrically conductive signal trace 210 and/or with a single end of the electrically conductive signal trace. As another example, and as illustrated in FIGS. 2 and 4, transitions 100 may include a first electrically conductive trace interface tip 222, which also may be referred to herein as a first trace tip 222, and a second electrically conductive trace interface tip 224, which also may be referred to herein as a second trace tip 224.

First trace tip 222 may extend from a first trace end region 216 of electrically conductive signal trace 210 and/or may be configured to form an electrical connection with first electronic component 20. Similarly, second trace tip 224 may extend from a second trace end region 218 of electrically conductive signal trace 210 and/or may be configured to form an electrical connection with second electronic component 30. As illustrated, first trace tip 222 may extend perpendicular, or at least substantially perpendicular, to first trace end region 216 and/or may extend through a corresponding first region of the flexible dielectric membrane. Similarly, second trace tip 224 may extend perpendicular, or at least substantially perpendicular, to second trace end region 218 and/or may extend through a corresponding second region of the flexible dielectric membrane.

As illustrated in FIGS. 1, 3, and 8-9, transitions 100 may include an electrically conductive plane interface tip 246, which also may be referred to herein as a plane tip 246. Plane tip 246, when present, may extend from electrically conductive ground plane 240 and/or may be configured to form an electrical connection with first electronic component 20 and/or with second electronic component 30. As illustrated, plane tip 246 may extend perpendicular, or at least substantially perpendicular, to the elongate axis of microstrip transmission line 200 and/or of electrically conductive ground plane 240. As also illustrated, plane tip 246 may extend through a corresponding region of flexible dielectric membrane 120 and/or of a membrane layer 122 thereof, thereby permitting and/or facilitating the electrical connection with the first electronic component and/or with the second electronic component.

It is within the scope of the present disclosure that transitions 100 may include a plurality of plane tips 246. As an example, and similar to the example that is illustrated in FIG. 7 with respect to trace tips 220, the plurality of plane tips 246 may extend from and/or provide electrical communication with a single electrically conductive ground plane 240 and/or with a single end of the electrically conductive ground plane. As another example, and as illustrated in FIG. 3, transitions 100 may include a first electrically conductive plane interface tip 248, which also may be referred to herein as a first plane tip 248, and a second electrically conductive plane interface tip 250, which also may be referred to herein as a second plane tip 250.

First plane tip 248 may extend from a first plane end region 242 of electrically conductive ground plane 240 and/or may be configured to form an electrical connection with first electronic component 20. Similarly, second plane tip 250 may extend from a second plane end region 244 of electrically conductive ground plane 240 and/or may be configured to form an electrical connection with second electronic component 30. As illustrated, first plane tip 248 may extend perpendicular, or at least substantially perpendicular, to first plane end region 242 and/or may extend through a corresponding first region of the flexible dielectric membrane. Similarly, second plane tip 250 may extend perpendicular, or at least substantially perpendicular, to second plane end region 244 and/or may extend through a corresponding second region of the flexible dielectric membrane.

In some examples, and as perhaps best illustrated in FIGS. 2, 4, and 8-9, transitions 100 and/or microstrip transmission lines 200 thereof may include a plurality of stacked electrically conductive signal traces 210 that may include at least a first stacked electrically conductive signal trace and a second stacked electrically conductive signal trace. In such a configuration, a corresponding region of flexible dielectric membrane 120, such as a corresponding membrane layer 122, may extend between and/or electrically isolate adjacent electrically conductive signal traces 210, such as via extending between the first stacked electrically conductive signal trace and the second stacked electrically conductive signal trace. Also in such a configuration, transitions 100 and/or microstrip transmission lines 200 thereof may include a conductor via 226, as illustrated in FIGS. 2 and 4, that may electrically interconnect adjacent electrically conductive signal traces 210, such as the first electrically conductive signal trace and the second electrically conductive signal trace. Such a configuration may permit and/or facilitate increased current carrying capacity for microstrip transmission lines 200.

Figure 6:
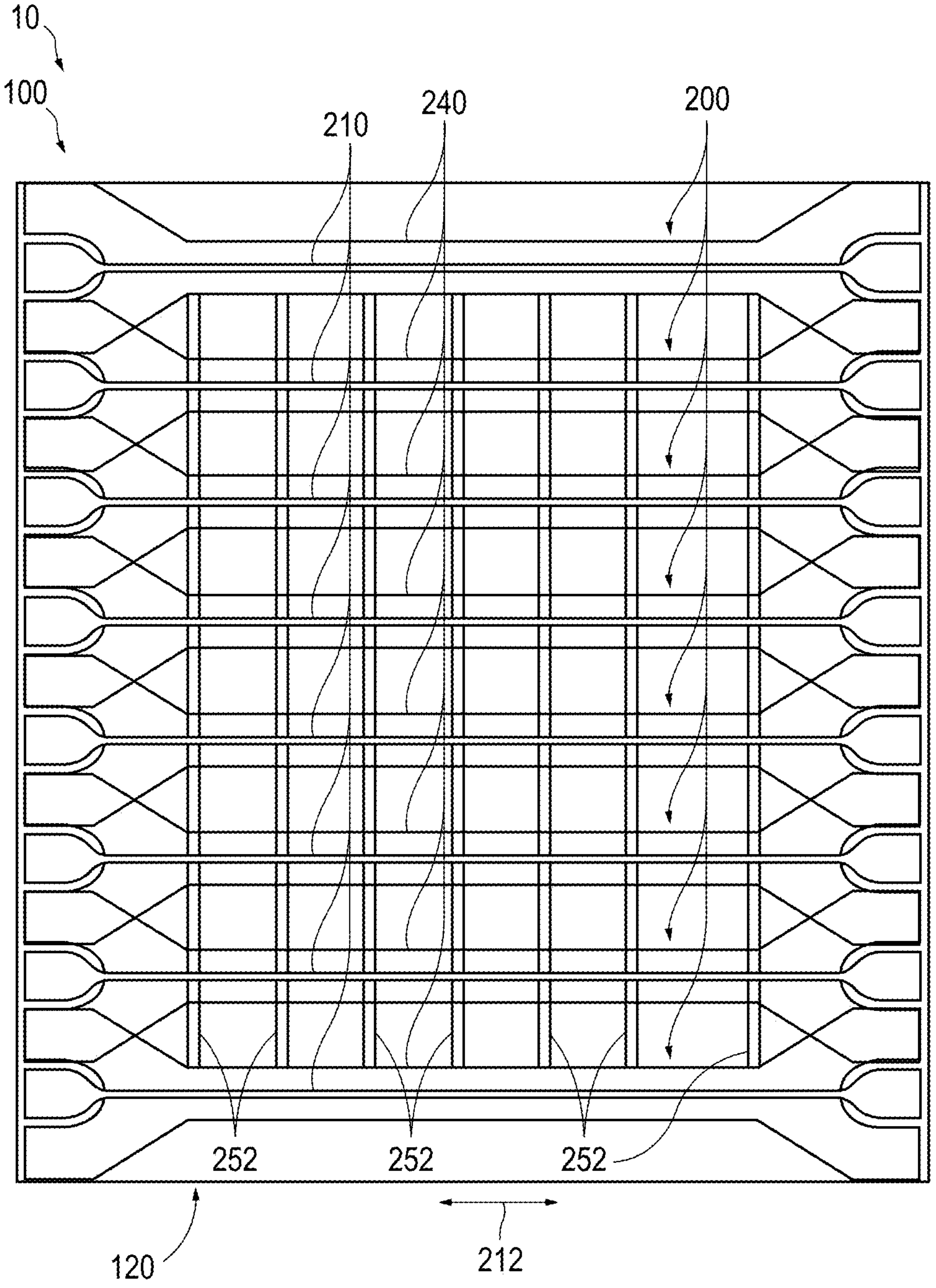
FIG. 6 is a schematic top view illustrating an example of a flexible, radio-frequency transition according to the present disclosure.
Figure 10:
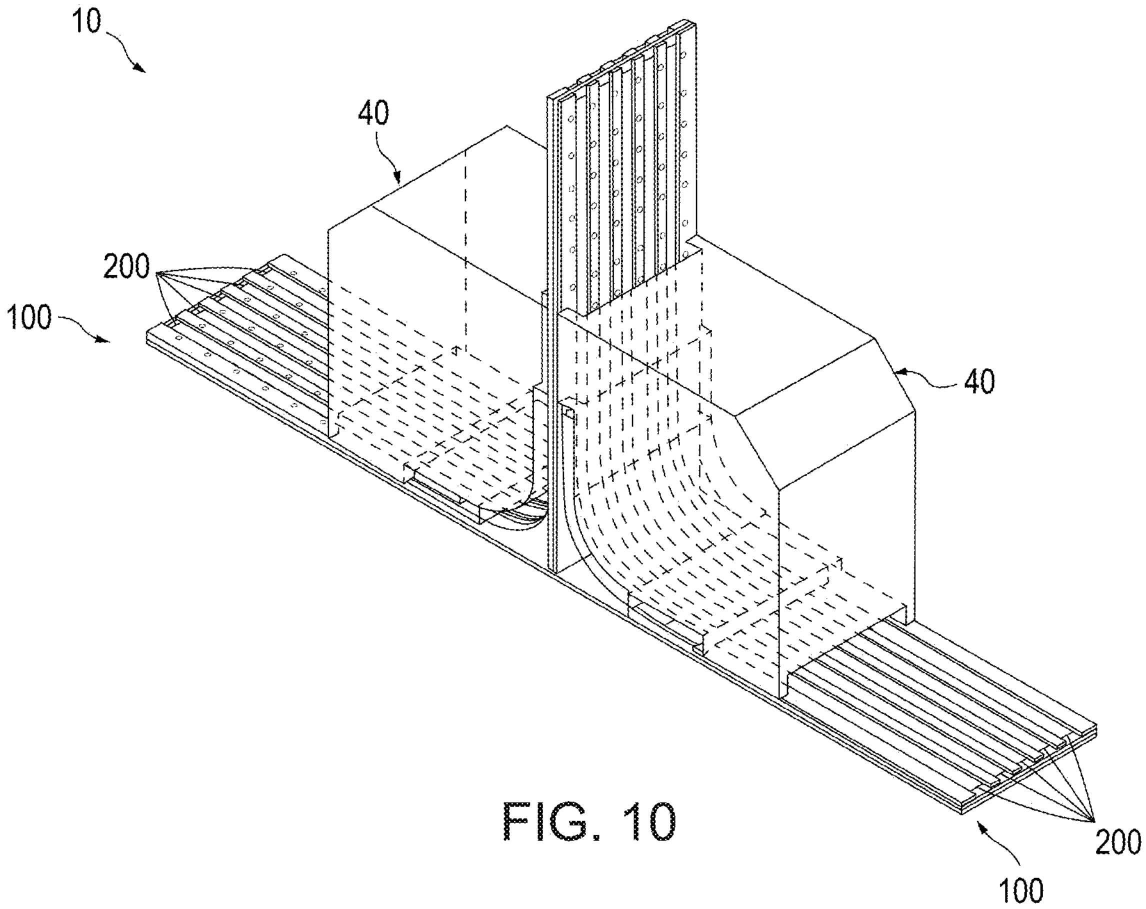
FIG. 10 is a schematic profile view illustrating an example of a connector that interconnects three flexible, radio-frequency transitions, according to the present disclosure.

As illustrated in FIGS. 1, 6, and 10, transitions 100 may include a plurality of microstrip transmission lines 200. The plurality of microstrip transmission lines 200 may include a plurality of electrically conductive signal traces 210 and a plurality of electrically conductive ground planes 240. Stated differently, each microstrip transmission line of the plurality of microstrip transmission lines 200 may include a corresponding electrically conductive signal trace 210 and a corresponding electrically conductive ground plane 240. The plurality of electrically conductive signal traces may extend parallel, or at least substantially parallel, to one another and/or may extend within a single layer, which also may be referred to herein as a single trace layer, of transition 100. Similarly, the plurality of electrically conductive ground planes may extend parallel, or at least substantially parallel, to one another and/or may extend within a single layer, which also may be referred to herein as a single plane layer, of transition 100. The plurality of electrically conductive signal traces and/or the plurality of electrically conductive ground planes may extend along and/or parallel to signal conduction axis 212.

When transition 100 includes the plurality of microstrip transmission lines 200, a pitch, a spacing, and/or a minimum distance 214, as illustrated in FIG. 1, between adjacent electrically conductive signal traces 210 may have and/or define any suitable magnitude. As examples, the pitch, the spacing, and/or the minimum distance may be at most 1000 micrometers, at most 900 micrometers, at most 800 micrometers, at most 700 micrometers, at most 600 micrometers, at most 500 micrometers, at most 400 micrometers, at most 300 micrometers, at most 200 micrometers, or at most 100 micrometers. For relatively smaller pitches, such as pitches of less than 300 micrometers, less than 200 micrometers, or less than 100 micrometers, the smaller pitch may be facilitated by forming adjacent electrically conductive signal traces 210 in different metal layers and/or on different membrane layers 122 within transition 100.

With continued reference to FIGS. 1 and 6, and when transitions 100 include the plurality of microstrip transmission lines 200, transitions 100 also may include a plurality of ground connections 252. Ground connections 252, when present, may be configured to electrically interconnect a central region of adjacent electrically conductive ground planes to one another, such as to decrease a potential for transmission line mode effects within microstrip transmission lines 200. Ground connections 252 may extend perpendicular, or at least substantially perpendicular, to signal conduction axis 212.

As discussed, each electrically conductive ground plane 240 may include a corresponding first plane end region 242 and a corresponding second plane end region 244. As illustrated in FIG. 1, the corresponding first plane end region of adjacent electrically conductive ground planes may be in electrical communication with and/or may be electrically connected to one another. Similarly, the corresponding second plane end region of adjacent electrically conductive ground planes may be in electrical communication with and/or may be electrically connected to one another.

As discussed, transition 100 may electrically interconnect first electronic component 20 and second electronic component 30 within an electronic system 10. Stated differently, and in electronic systems 10, transition 100 may be configured to convey a radio-frequency signal between the first electronic component and the second electronic component. As an example, and as illustrated in FIGS. 1-4, first electronic component 20 may include one or more first contact locations 22, and second electronic component 30 may include one or more second contact locations 32. In such a configuration, electrically conductive trace interface tips 220 and/or electrically conductive plane interface tips 246 may be configured to electrically interface with and/or to electrically contact first contact locations 22 and/or second contact locations 32 to permit and/or facilitate the electrical interconnection. Examples of first electronic component 20 and/or of second electronic component 30 include a device under test (DUT), a probe core, a daughter card, and/or a printed circuit board.

The electrical interconnection between the first electronic component and the second electronic component may be accomplished in any suitable manner. As an example, systems 10 further may include a connector 40. Connector 40, when present, may be configured to retain transition 100 in electrical communication with first electronic component 20, or first contact locations 22 thereof, and/or with second electronic component 30, or second contact locations 32 thereof. Connector 40 may include any suitable structure. As an example, connector 40 may include and/or be a pressure connector that may be configured to apply a retention force to transition 100 to retain the transition in electrical communication with first electronic component 20 and/or with second electronic component 30. Examples of the pressure connector include a resilient material and/or a spring, which may be configured to generate the retention force.

It is within the scope of the present disclosure that transitions 100 may electrically interconnect first electronic component 20 and second electronic component 30 without utilizing solder and/or without utilizing a soldered connection between the transition and the first electronic component and/or between the transition and the second electronic component. As an example, electrically conductive signal trace 210 may electrically interconnect first electronic component 20 and second electronic component 30 without utilizing the soldered connection. As another example, an electrical connection between the electrically conductive signal trace and the first electronic component may be free of solder. As another example, an electrical connection between the electrically conductive signal trace and the second electronic component may be free of solder.

As discussed, transitions 100 may be utilized to permit and/or facilitate a variety of new, and beneficial, spatial arrangements between first electronic component 20 and second electronic component 30. Additionally or alternatively, transitions 100 may be utilized to permit and/or facilitate construction of electronic systems 10 that otherwise would be required to be constructed on a single printed circuit board, thereby alleviating spatial constraints and/or signal quality vs. signal density trade-offs that otherwise would be present if a system that is functionally equivalent to electronic system 10 were fabricated on the single printed circuit board. Additionally or alternatively, transitions 100 may be utilized to permit and/or facilitate construction of electronic systems 10 where wear-prone and/or failure-prone components readily may be replaced without the need to replace all components that otherwise would be present on the single printed circuit board. Examples of such spatial arrangements and/or electronic systems 10 are illustrated in FIGS. 11-21.

Figure 11:
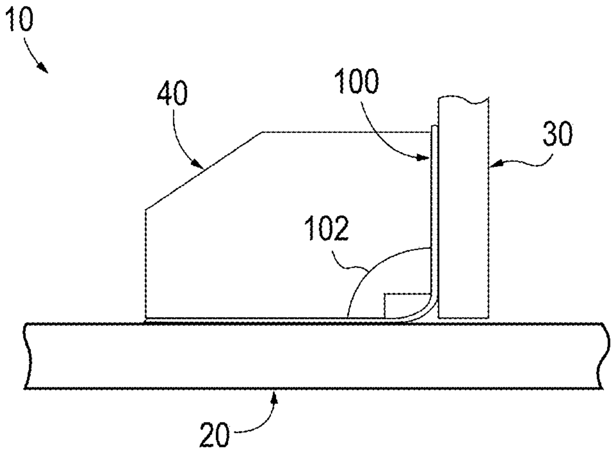
FIG. 11 illustrates an example of a transition angle for a flexible, radio-frequency transition according to the present disclosure.
Figure 12:
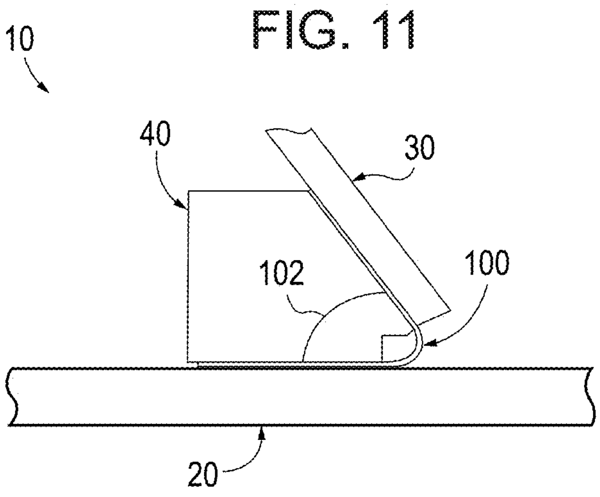
FIG. 12 illustrates an example of a transition angle for a flexible, radio-frequency transition according to the present disclosure.
Figure 13:
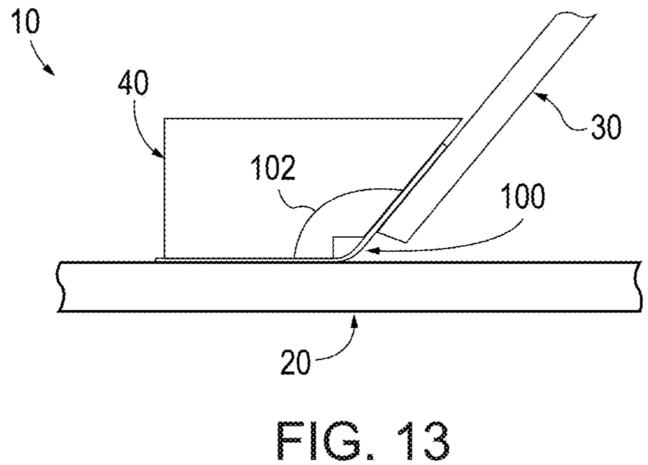
FIG. 13 illustrates an example of a transition angle for a flexible, radio-frequency transition according to the present disclosure.
Figure 15:
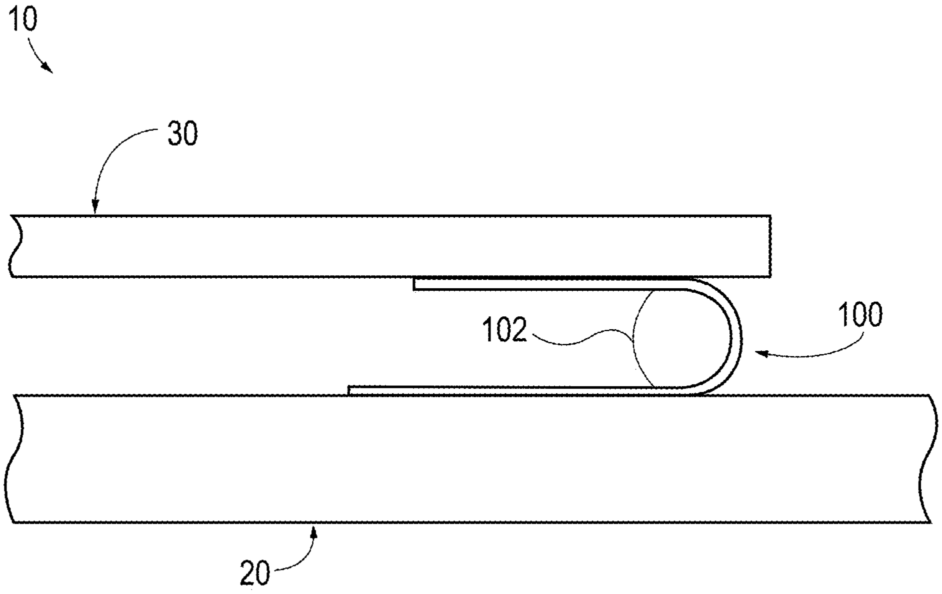
FIG. 15 illustrates an example of a transition angle for a flexible, radio-frequency transition according to the present disclosure.

FIGS. 10-11 illustrate that transitions 100, when utilized in conjunction with connectors 40, may be utilized to join two or more electronic components that are oriented orthogonal, at least substantially orthogonal, at right angles, or at least substantially at right angles, to one another. FIG. 12 illustrates transitions 100 being utilized to join first electronic component 20 and second electronic component 30 at an acute transition angle 102, while FIG. 13 illustrates transitions 100 being utilized to join first electronic component 20 and second electronic component 30 at an obtuse transition angle 102. FIG. 14 illustrates that a single transition 100 may undergo a plurality of transition angles 102, while FIG. 15 illustrates that a single transition 100 may be bent to a transition angle 102 of 180 degrees. Both examples may permit and/or facilitate improved spacing and/or tight stacking of first electronic component 20 and second electronic component 30, which may provide benefits in terms of space savings and/or thermal efficiencies for electronic systems 10.

Figure 16:
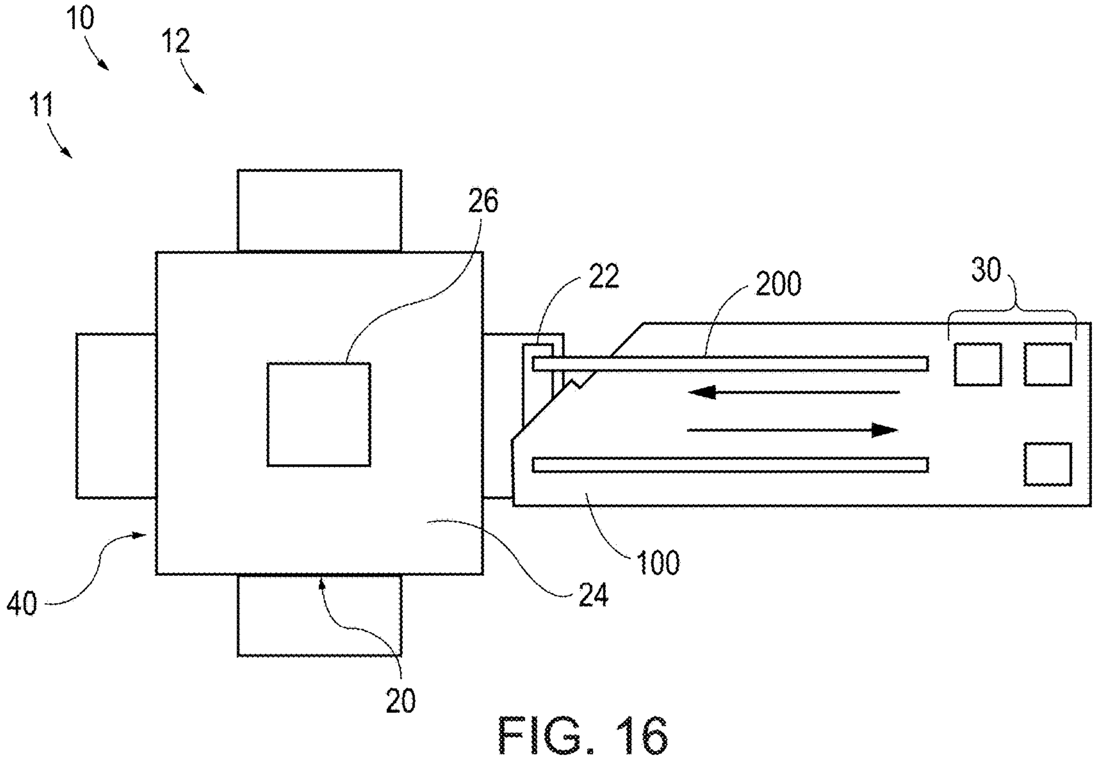
FIG. 16 is a schematic illustration of an example of an electronic system according to the present disclosure.
Figure 17:
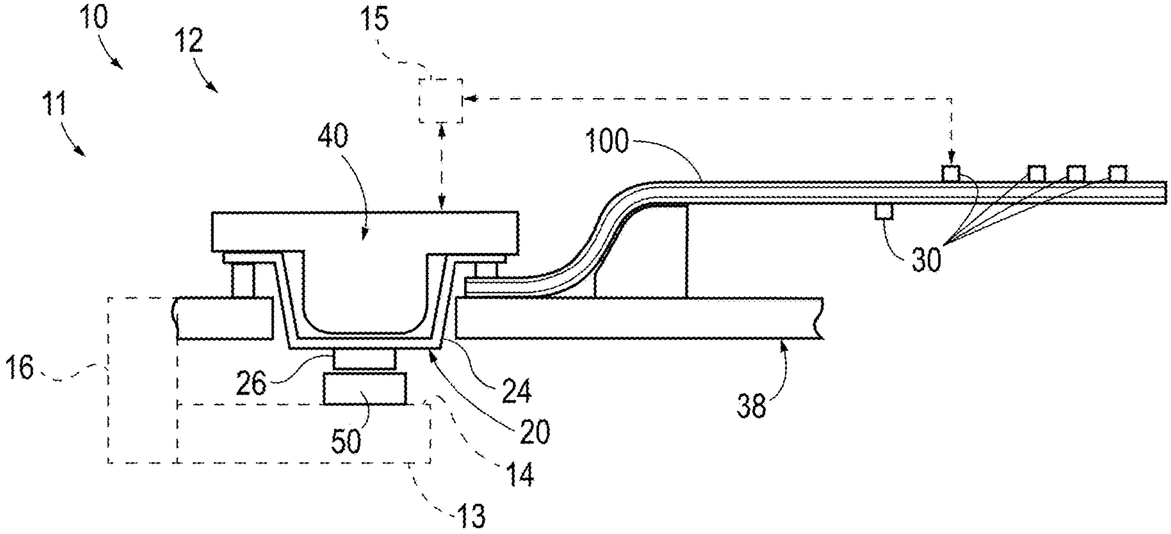
FIG. 17 is a schematic illustration of an example of an electronic system according to the present disclosure.

FIG. 16 is a bottom view of an electronic system 10, in the form of a probe system 11 that is configured to test the operation of a device under test (DUT) 50, while FIG. 17 is a side view of the probe system of FIG. 16. The probe system includes a transition 100 integrated with a probe core 12 of the probe system. In FIGS. 16-17, transition 100 is utilized to electrically interconnect a plurality of second electronic components 30, which are formed on transition 100, to both a first electronic component 20, in the form of a membrane probe assembly 24 that includes a plurality of probes 26, and a third electronic component 38, in the form of a primary printed circuit board. A connector 40, in the form of a spring package and space transformer for the probe system, is utilized to retain electrical communication among first electronic component 20, third electronic component 38, and transition 100.

Figure 18:
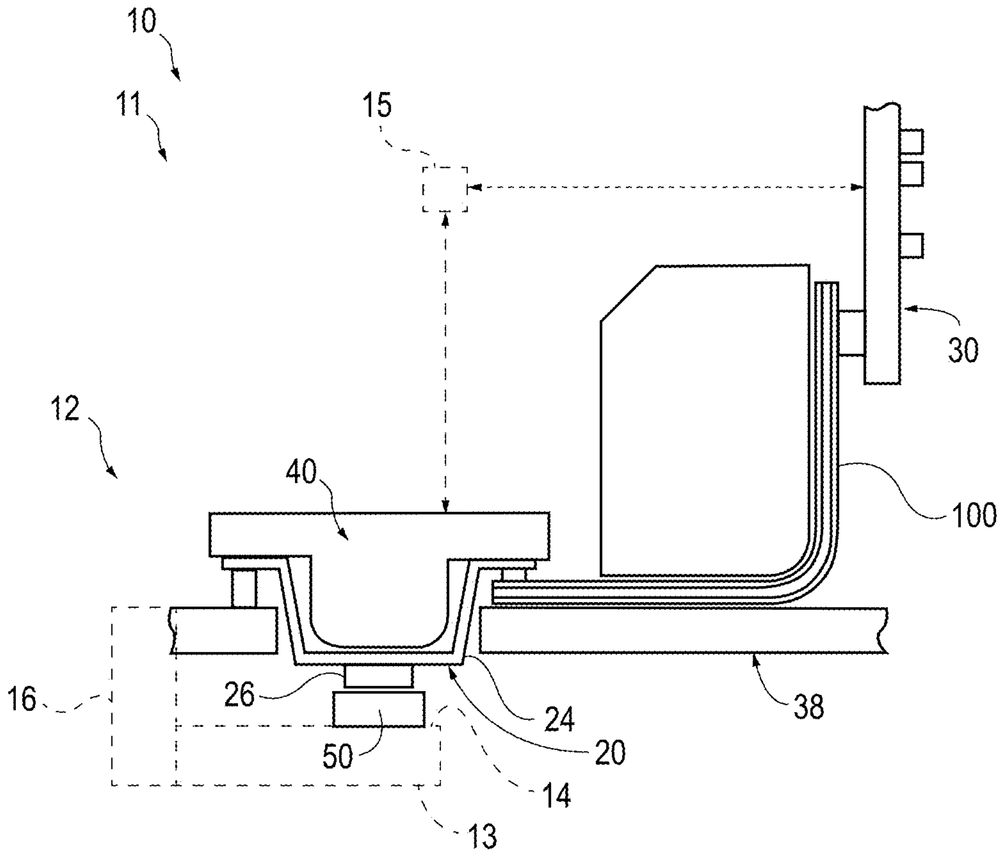
FIG. 18 is a schematic illustration of an example of an electronic system according to the present disclosure.
Figure 19:
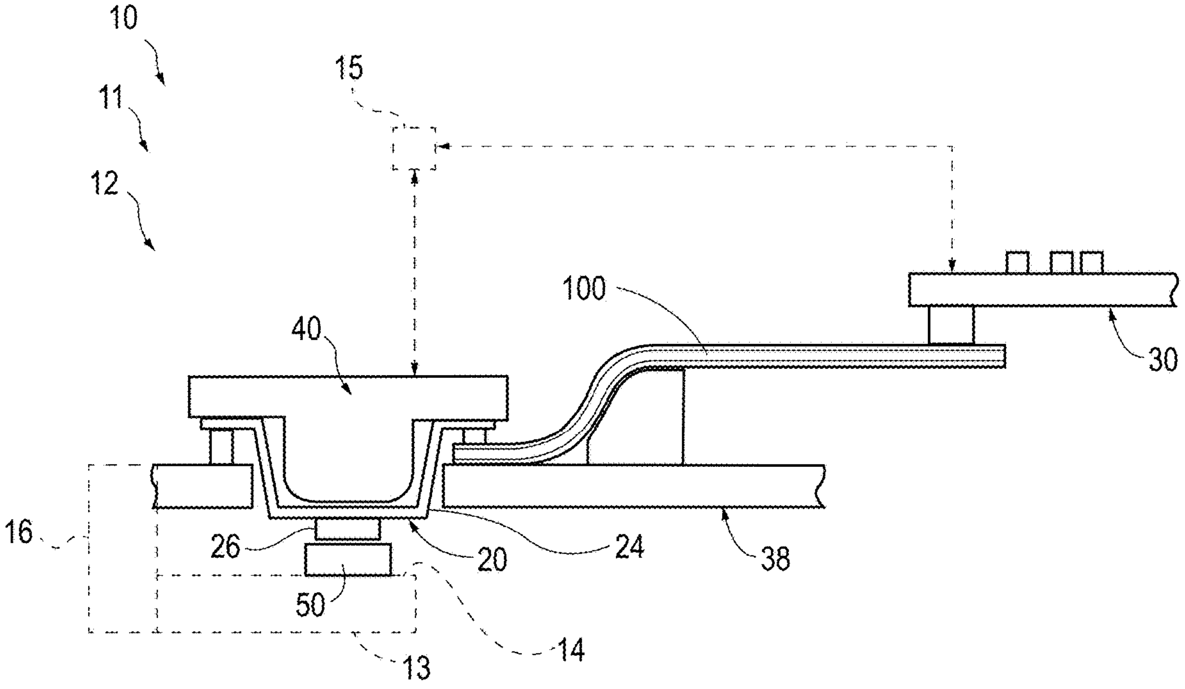
FIG. 19 is a schematic illustration of an example of an electronic system according to the present disclosure.
Figure 20:
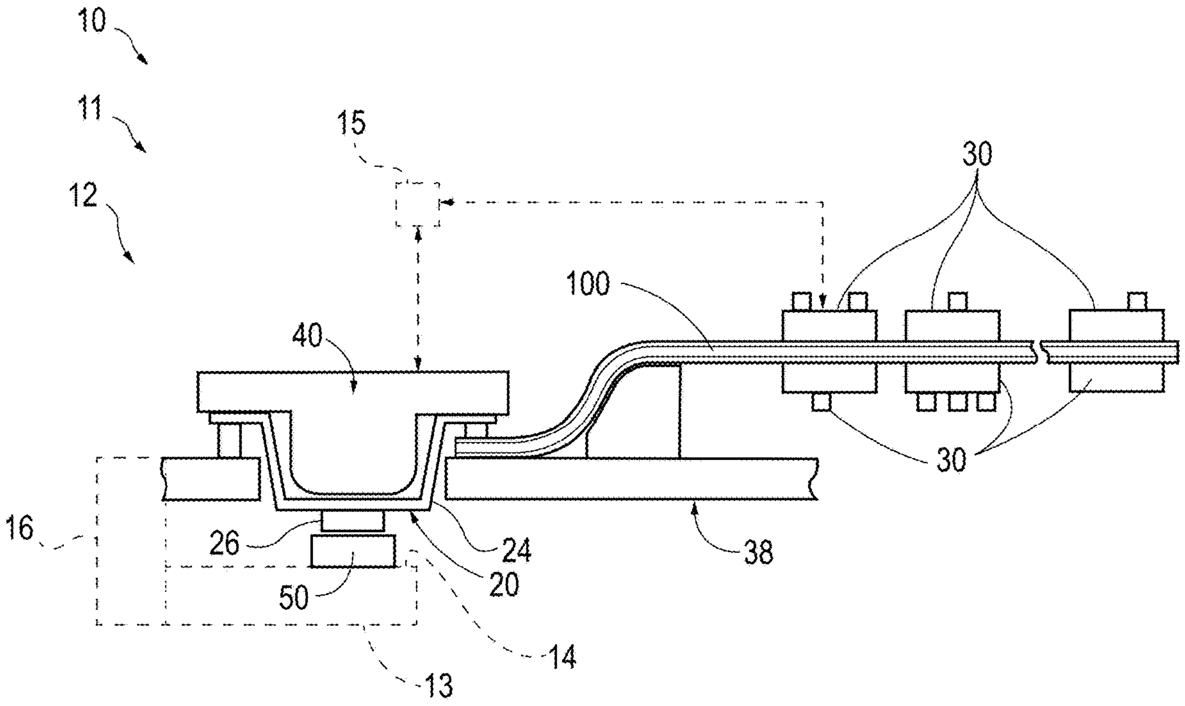
FIG. 20 is a schematic illustration of an example of an electronic system according to the present disclosure.
Figure 21:
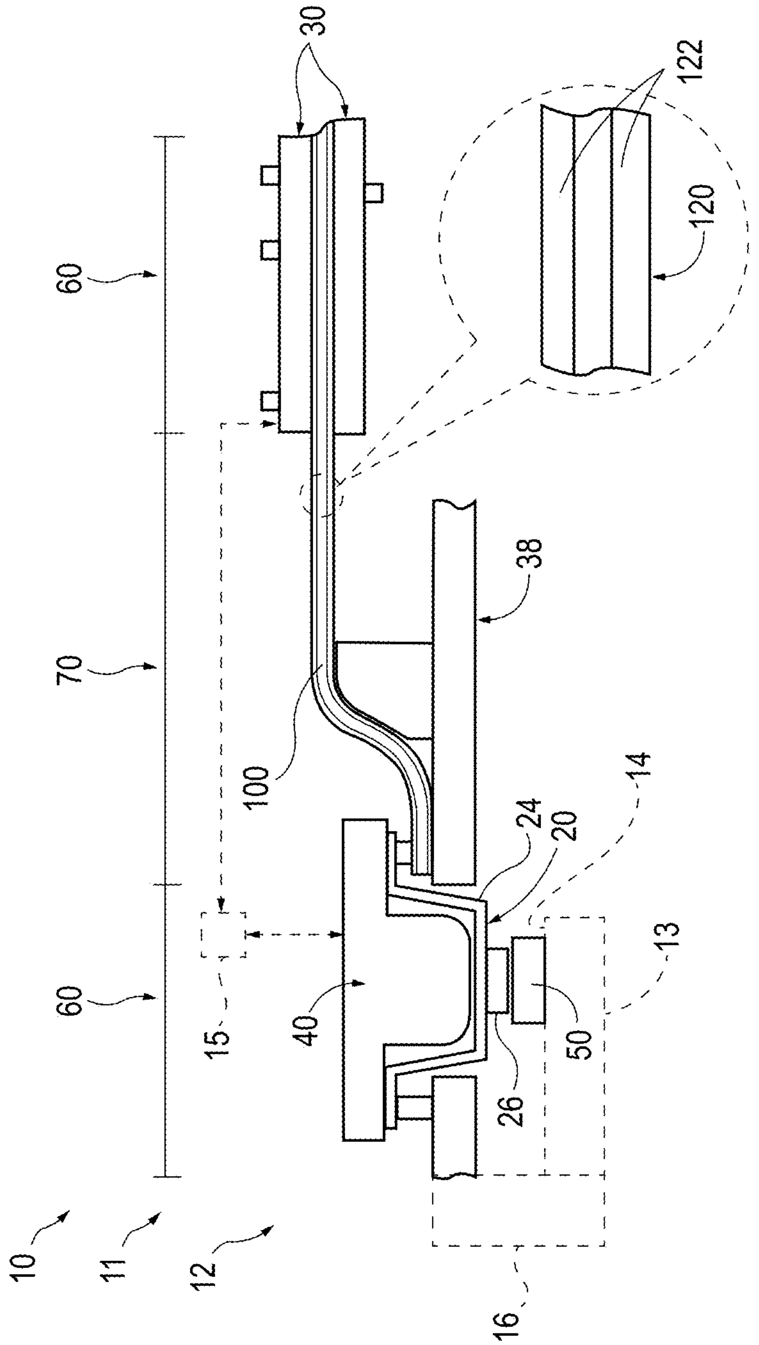
FIG. 21 is a schematic illustration of an example of an electronic system according to the present disclosure.

FIG. 18 illustrates a configuration that is similar to FIGS. 16-17; however, in FIG. 18 second electronic component 30 is a separate printed circuit board, or daughter card, that communicates with probe core 12 via transition 100. In FIG. 18, second electronic component 30 is oriented perpendicular, or at least substantially perpendicular, to both first electronic component 20 and third electronic component 38. FIG. 19 illustrates an alternative orientation for the components illustrated in FIG. 18. In FIG. 19, first electronic component 20, second electronic component 30, and third electronic component 38 extend parallel, or at least substantially parallel, to one another. FIG. 20 illustrates that a plurality of different and/or distinct second electronic components 30 may communicate with probe core 12 via transition 100, or via a single transition 100. FIG. 21 emphasizes the spatial flexibility provided by electronic systems 10 that utilize transitions 100. In particular, such electronic systems 10 may utilize a combination of rigid components 60 and flexible components 70 to improve overall spatial efficiency.

The configurations illustrated in FIGS. 16-21 may permit and/or facilitate positioning one or more second electronic components 30 closer to device under test 50 than otherwise would be possible utilizing a conventional probe system that does not include transition 100. The configurations illustrated in FIGS. 16-21 additionally or alternatively may permit and/or facilitate higher-frequency communication between second electronic components 30 and DUT 50 than would be possible utilizing the conventional probe system. The configurations illustrated in FIGS. 16-21 additionally or alternatively may permit and/or facilitate utilization of different second electronic components 30, thereby permitting different types of tests to be performed on device under test 50 without the need to replace an entirety of probe core 12, as would be needed in conventional probe systems.

With continued reference to FIGS. 16-21, electronic systems 10 in the form of probe systems 11 also may include one or more additional structures, which may be utilized with conventional probe systems. As an example, probe systems 11 may include a chuck 13 that defines a support surface 14, which may be configured to support DUT 50. Examples of chuck 13 include a temperature-controlled chuck, a thermal chuck, a vacuum chuck, and/or an electrically shielded chuck. As another example, probe systems 11 may include a signal generation and analysis assembly 15, which may be configured to provide a test signal to the DUT and/or to receive a resultant signal from the DUT, such as via probe core 12. Examples of signal generation and analysis assembly 15 include a power source, an AC power source, a DC power source, a function generator, a signal analyzer, an electromagnetic signal generator, and/or an electromagnetic signal detector. As another example, probe systems 11 may include a translation assembly 16, which may be configured to operatively translate and/or rotate probe core 12 and DUT 50 relative to one another. Examples of translation assembly 16 include a linear actuator, a rotary actuator, a rack and pinion assembly a lead screw and nut assembly, a ball screw and nut assembly, a motor, a linear motor, a servo motor, a stepper motor, and/or a piezoelectric actuator.

DUT 50 may include any suitable structure that is configured to be tested by probe system 11. Examples of DUT 50 include an electronic device, an optical device, and/or an optoelectronic device. In some examples, DUT 50 may include and/or be a single, a singulated, and/or a packaged DUT 50. In some examples, DUT 50 may be formed and/or positioned on a substrate, which may include a plurality of distinct DUTs 50.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of flexible, radio-frequency transitions and electronic systems, according to the present disclosure, are presented in the following enumerated paragraphs. It is within the scope of the present disclosure that an individual step of a method recited herein, including in the following enumerated paragraphs, may additionally or alternatively be referred to as a "step for" performing the recited action.

A1. A flexible, radio-frequency transition configured to electrically interconnect a first electronic component and a second electronic component to facilitate radio-frequency electrical communication therebetween, the transition comprising:

a flexible dielectric membrane; and a microstrip transmission line formed on the flexible dielectric membrane, wherein the microstrip transmission line includes an electrically conductive signal trace and an electrically conductive ground plane for the electrically conductive signal trace.

A2. The transition of paragraph A1, wherein the flexible dielectric membrane includes at least one of a flexible polymeric membrane and a flexible polyimide membrane.

A3. The transition of any of paragraphs A1-A2, wherein an electrically insulating region of the flexible dielectric membrane extends between, and electrically isolates, the electrically conductive signal trace and the electrically conductive ground plane.

A4. The transition of paragraph A3, wherein the electrically insulating region of the flexible dielectric membrane includes an insulating membrane layer, wherein the electrically conductive signal trace is formed on a trace side of the insulating membrane layer, and further wherein the electrically conductive ground plane is formed on a plane side of the insulating membrane layer.

A5. The transition of any of paragraphs A3-A4, wherein the electrically insulating region of the flexible dielectric membrane includes an insulating membrane region that is defined on a surface of at least one of the flexible dielectric membrane and a membrane layer of the flexible dielectric membrane, wherein the electrically conductive signal trace and the electrically conductive ground trace both are formed on the surface.

A6. The transition of any of paragraphs A1-A5, wherein the flexible dielectric membrane includes a plurality of membrane layers.

A7. The transition of paragraph A6, wherein the electrically conductive signal trace is defined between two adjacent trace-supporting membrane layers of the plurality of membrane layers.

A8. The transition of any of paragraphs A6-A7, wherein the electrically conductive ground plane is defined between two adjacent plane-supporting membrane layers of the plurality of membrane layers.

A9. The transition of paragraph A8 when dependent from paragraph A7, wherein the two adjacent plane-supporting membrane layers are the two adjacent trace-supporting membrane layers.

A10. The transition of paragraph A8 when dependent from paragraph A7, wherein at least one of the two adjacent plane-supporting membrane layers differs from at least one of the two trace-supporting membrane layers.

A11. The transition of any of paragraphs A1-A10, wherein the electrically conductive signal trace is defined by at least one of an electrically conductive trace material, a metallic trace material, aluminum, and copper.

A12. The transition of any of paragraphs A1-A11, wherein the electrically conductive ground plane is defined by at least one of an electrically conductive plane material, a metallic plane material, aluminum, and copper.

A13. The transition of any of paragraphs A1-A12, wherein the transition is configured to electrically interconnect the first electronic component and the second electronic component, and to permit radio-frequency electrical communication therebetween, throughout a range of transition angles.

A14. The transition of paragraph A13, wherein the range of transition angles extends between angles of:

(i) at least 0 degrees, at least 5 degrees, at least 10 degrees, at least 15 degrees, at least 20 degrees, at least 30 degrees, at least 45 degrees, or at least 90 degrees; and (ii) at most 350 degrees, at most 340 degrees, at most 330 degrees, at most 320 degrees, at most 310 degrees, at most 300 degrees, at most 270 degrees, at most 240 degrees, at most 210 degrees, at most 180 degrees, at most 150 degrees, at most 120 degrees, or at most 90 degrees.

A15. The transition of any of paragraphs A13-A14, wherein the transition includes a first transition angle and a second transition angle, and further wherein the first transition angle and the second transition angle both are selected from within the range of transition angles.

A16. The transition of any of paragraphs A1-A15, wherein the transition further includes an electrically conductive trace interface tip, which extends from the electrically conductive signal trace and is configured to form an electrical connection with one of the first electronic component and the second electronic component, optionally wherein the electrically conductive trace interface tip extends perpendicular, or at least substantially perpendicular, to an elongate axis of the electrically conductive signal trace, and further optionally wherein the electrically conductive trace interface tip extends through a corresponding region of the flexible dielectric membrane.

A17. The transition of any of paragraphs A1-A16, wherein the transition further includes:

(i) a first electrically conductive trace interface tip, which extends from a first trace end region of the electrically conductive signal trace and is configured to form an electrical connection with the first electronic component, optionally wherein the first electrically conductive trace interface tip extends perpendicular, or at least substantially perpendicular, to the first trace end region of the electrically conductive signal trace, and further optionally wherein the first electrically conductive trace interface tip extends through a corresponding first region of the flexible dielectric membrane; and (ii) a second electrically conductive trace interface tip, which extends from an opposed second trace end region of the electrically conductive signal trace and is configured to form an electrical connection with the second electronic component, optionally wherein the second electrically conductive trace interface tip extends perpendicular, or at least substantially perpendicular, to the second trace end region of the electrically conductive signal trace, and further optionally wherein the second electrically conductive trace interface tip extends through a corresponding second region of the flexible dielectric membrane.

A18. The transition of any of paragraphs A1-A17, wherein the transition further includes an electrically conductive plane interface tip, which extends from the electrically conductive ground plane and is configured to form an electrical connection with one of the first electronic component and the second electronic component, optionally wherein the electrically conductive plane interface tip extends perpendicular, or at least substantially perpendicular, to the electrically conductive ground plane, and further optionally wherein the electrically conductive plane interface tip extends through a corresponding region of the flexible dielectric membrane.

A19. The transition of any of paragraphs A1-A18, wherein the transition further includes:

(i) a first electrically conductive plane interface tip, which extends from a first plane end region of the electrically conductive ground plane and is configured to form an electrical connection with the first electronic component, optionally wherein the first electrically conductive plane interface tip extends perpendicular, or at least substantially perpendicular, to the first plane end region of the electrically conductive ground plane, and further optionally wherein the first electrically conductive plane interface tip extends through a corresponding first region of the flexible dielectric membrane; and (ii) a second electrically conductive plane interface tip, which extends from an opposed second plane end region of the electrically conductive ground plane and is configured to form an electrical connection with the second electronic component, optionally wherein the second electrically conductive plane interface tip extends perpendicular, or at least substantially perpendicular, to the second plane end region of the electrically conductive ground plane, and further optionally wherein the second electrically conductive plane interface tip extends through a corresponding second region of the flexible dielectric membrane.

A20. The transition of any of paragraphs A1-A19, wherein the microstrip transmission line includes a plurality of stacked electrically conductive signal traces that includes at least a first stacked electrically conductive signal trace and a second stacked electrically conductive signal trace, wherein a corresponding region of the flexible dielectric membrane extends between, and electrically isolates, the first stacked electrically conductive signal trace and the second stacked electrically conductive signal trace, and further wherein the microstrip transmission line includes a conductor via that electrically interconnects the first stacked electrically conductive signal trace and the second stacked electrically conductive signal trace.

A21. The transition of any of paragraphs A1-A20, wherein the transition includes a plurality of microstrip transmission lines that includes a plurality of electrically conductive signal traces and a plurality of electrically conductive ground planes, wherein each microstrip transmission line of the plurality of microstrip transmission lines includes a corresponding electrically conductive signal trace of the plurality of electrically conductive signal traces and a corresponding electrically conductive ground plane of the plurality of electrically conductive ground planes.

A22. The transition of paragraph A21, wherein each electrically conductive signal trace of the plurality of electrically conductive signal traces at least one of:

(i) extends parallel, or at least substantially parallel, to one another; and (ii) extends within a single trace layer of the transition.

A23. The transition of any of paragraphs A21-A22, wherein each electrically conductive ground plane of the plurality of electrically conductive ground planes at least one of:

(i) extends parallel, or at least substantially parallel, to one another; and (ii) extends within a single plane layer of the transition.

A24. The transition of any of paragraphs A21-A23, wherein the plurality of electrically conductive signal traces extends along a signal conduction axis.

A25. The transition of paragraph A24, wherein a minimum distance between adjacent electrically conductive signal traces, as measured in a direction that is perpendicular to the signal conduction axis, is at most 1000 micrometers, at most 900 micrometers, at most 800 micrometers, at most 700 micrometers, at most 600 micrometers, at most 500 micrometers, at most 400 micrometers, at most 300 micrometers, at most 200 micrometers, or at most 100 micrometers.

A26. The transition of any of paragraphs A21-A25, wherein the plurality of electrically conductive ground planes extends along a/the signal conduction axis.

A27. The transition of any of paragraphs A21-A26, wherein the transition further includes a plurality of ground connections that electrically interconnect a central region of adjacent electrically conductive ground planes of the plurality of electrically conductive ground planes.

A28. The transition of paragraph A27, wherein the plurality of ground connections extends perpendicular, or at least substantially perpendicular, to a/the signal conduction axis.

A29. The transition of any of paragraphs A21-A28, wherein each electrically conductive ground plane of the plurality of electrically conductive ground planes includes a corresponding first plane end region and a corresponding second plane end region, wherein the corresponding first plane end region of adjacent electrically conductive ground planes of the plurality of electrically conductive ground planes are in electrical communication with one another, and further wherein the corresponding second plane end regions of the adjacent electrically conductive ground planes are in electrical communication with one another.

B1. An electronic system that utilizes radio-frequency communication, the system comprising:

a first electronic component;

a second electronic component; and the transition of any of paragraphs A1-A29, wherein the electrically conductive signal trace electrically interconnects the first electronic component and the second electronic component and is configured to convey a radio-frequency signal between the first electronic component and the second electronic component.

B2. The system of paragraph B1, wherein the system further includes a connector configured to retain the transition in electrical communication with at least one of the first electronic component and the second electronic component.

B3. The system of paragraph B2, wherein the connector includes a pressure connector configured to apply a retention force to the transition to retain the transition in electrical communication with the at least one of the first electronic component and the second electronic component.

B4. The system of paragraph B3, wherein the pressure connector includes at least one of a resilient material and a spring, which is configured to generate the retention force.

B5. The system of any of paragraphs B1-B4, wherein at least one of:

(i) the electrically conductive signal trace electrically interconnects the first electronic component and the second electrical component without utilizing a soldered connection;

(ii) an electrical connection between the electrically conductive signal trace and the first electronic component is free of solder; and (iii) an electrical connection between the electrically conductive signal trace and the second electronic component is free of solder.

INDUSTRIAL APPLICABILITY

The electronic systems and transitions disclosed herein are applicable to the electronic device manufacture and test industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A flexible, radio-frequency transition configured to electrically interconnect a first electronic component and a second electronic component to facilitate radio-frequency electrical communication therebetween, the transition comprising:

a flexible dielectric membrane; and a microstrip transmission line formed on the flexible dielectric membrane, wherein the microstrip transmission line includes an electrically conductive signal trace and an electrically conductive ground plane for the electrically conductive signal trace;

wherein the transition is configured to electrically interconnect the first electronic component and the second electronic component, and to permit radio-frequency electrical communication therebetween, throughout a range of transition angles; and wherein the transition further includes an electrically conductive trace interface tip, which extends from the electrically conductive signal trace and is configured to form an electrical connection with one of the first electronic component and the second electronic component, wherein the electrically conductive trace interface tip extends perpendicular to an elongate axis of the electrically conductive signal trace, and further wherein the electrically conductive trace interface tip extends through a corresponding region of the flexible dielectric membrane.

2. The transition of claim 1, wherein the flexible dielectric membrane includes at least one of a flexible polymeric membrane and a flexible polyimide membrane.

3. The transition of claim 1, wherein an electrically insulating region of the flexible dielectric membrane extends between, and electrically isolates, the electrically conductive signal trace and the electrically conductive ground plane.

4. The transition of claim 3, wherein the electrically insulating region of the flexible dielectric membrane includes an insulating membrane layer, wherein the electrically conductive signal trace is formed on a trace side of the insulating membrane layer, and further wherein the electrically conductive ground plane is formed on a plane side of the insulating membrane layer.

5. The transition of claim 3, wherein the electrically insulating region of the flexible dielectric membrane includes an insulating membrane region that is defined on a surface of at least one of the flexible dielectric membrane and a membrane layer of the flexible dielectric membrane, wherein the electrically conductive signal trace and the electrically conductive ground plane both are formed on the surface.

6. The transition of claim 1, wherein the flexible dielectric membrane includes a plurality of membrane layers, wherein the electrically conductive signal trace is defined between two adjacent trace-supporting membrane layers of the plurality of membrane layers, and further wherein the electrically conductive ground plane is defined between two adjacent plane-supporting membrane layers of the plurality of membrane layers.

7. The transition of claim 6, wherein the two adjacent plane-supporting membrane layers are the two adjacent trace-supporting membrane layers.

8. The transition of claim 6, wherein at least one of the two adjacent plane-supporting membrane layers differs from at least one of the two trace-supporting membrane layers.

9. The transition of claim 1, wherein the electrically conductive trace interface tip tapers to a point.

10. The transition of claim 1, wherein:

(i) the electrically conductive trace interface tip is a first electrically conductive trace interface tip, which extends from a first trace end region of the electrically conductive signal trace and is configured to form an electrical connection with the first electronic component; and (ii) wherein the transition further includes a second electrically conductive trace interface tip, which extends from an opposed second trace end region of the electrically conductive signal trace and is configured to form an electrical connection with the second electronic component.

11. The transition of claim 1, wherein the transition further includes an electrically conductive plane interface tip, which extends from the electrically conductive ground plane and is configured to form an electrical connection with one of the first electronic component and the second electronic component.

12. The transition of claim 1, wherein the transition further includes:

(i) a first electrically conductive plane interface tip, which extends from a first plane end region of the electrically conductive ground plane and is configured to form an electrical connection with the first electronic component; and (ii) a second electrically conductive plane interface tip, which extends from an opposed second plane end region of the electrically conductive ground plane and is configured to form an electrical connection with the second electronic component.

13. The transition of claim 1, wherein the microstrip transmission line includes a plurality of stacked electrically conductive signal traces that includes at least a first stacked electrically conductive signal trace and a second stacked electrically conductive signal trace, wherein a corresponding region of the flexible dielectric membrane extends between, and electrically isolates, the first stacked electrically conductive signal trace and the second stacked electrically conductive signal trace, and further wherein the microstrip transmission line includes a conductor via that electrically interconnects the first stacked electrically conductive signal trace and the second stacked electrically conductive signal trace.

14. The transition of claim 1, wherein the transition includes a plurality of microstrip transmission lines that includes a plurality of electrically conductive signal traces and a plurality of electrically conductive ground planes, wherein each microstrip transmission line of the plurality of microstrip transmission lines includes a corresponding electrically conductive signal trace of the plurality of electrically conductive signal traces and a corresponding electrically conductive ground plane of the plurality of electrically conductive ground planes.

15. The transition of claim 14, wherein the plurality of electrically conductive signal traces extends along a signal conduction axis, and further wherein a minimum distance between adjacent electrically conductive signal traces, as measured in a direction that is perpendicular to the signal conduction axis, is at most 1000 micrometers.

16. The transition of claim 14, wherein the transition further includes a plurality of ground connections that electrically interconnect a central region of adjacent electrically conductive ground planes of the plurality of electrically conductive ground planes.

17. The transition of claim 14, wherein each electrically conductive ground plane of the plurality of electrically conductive ground planes includes a corresponding first plane end region and a corresponding second plane end region, wherein the corresponding first plane end region of adjacent electrically conductive ground planes of the plurality of electrically conductive ground planes are in electrical communication with one another, and further wherein the corresponding second plane end regions of the adjacent electrically conductive ground planes are in electrical communication with one another.

18. An electronic system that utilizes radio-frequency communication, the system comprising:

a first electronic component;

a second electronic component; and the transition of claim 1, wherein the electrically conductive signal trace electrically interconnects the first electronic component and the second electronic component and is configured to convey a radio-frequency signal between the first electronic component and the second electronic component.

19. The system of claim 18, wherein the system further includes a connector configured to retain the transition in electrical communication with at least one of the first electronic component and the second electronic component.

20. The system of claim 19, wherein the connector includes a pressure connector configured to apply a retention force to the transition to retain the transition in electrical communication with the at least one of the first electronic component and the second electronic component.

21. The system of claim 18, wherein at least one of:

(i) the electrically conductive signal trace electrically interconnects the first electronic component and the second electrical component without utilizing a soldered connection;

(ii) an electrical connection between the electrically conductive signal trace and the first electronic component is free of solder; and (iii) an electrical connection between the electrically conductive signal trace and the second electronic component is free of solder.

22. A flexible, radio-frequency transition configured to electrically interconnect a first electronic component and a second electronic component to facilitate radio-frequency electrical communication therebetween, the transition comprising:

a flexible dielectric membrane; and a microstrip transmission line formed on the flexible dielectric membrane, wherein the microstrip transmission line includes an electrically conductive signal trace and an electrically conductive ground plane for the electrically conductive signal trace;

wherein the transition is configured to electrically interconnect the first electronic component and the second electronic component, and to permit radio-frequency electrical communication therebetween, throughout a range of transition angles, wherein an electrically insulating region of the flexible dielectric membrane extends between, and electrically isolates, the electrically conductive signal trace and the electrically conductive ground plane;

wherein the electrically insulating region of the flexible dielectric membrane includes an insulating membrane layer, wherein the electrically conductive signal trace is formed on a trace side of the insulating membrane layer, and further wherein the electrically conductive ground plane is formed on a plane side of the insulating membrane layer; and wherein the electrically insulating region of the flexible dielectric membrane includes an insulating membrane region that is defined on a surface of at least one of the flexible dielectric membrane and a membrane layer of the flexible dielectric membrane, wherein the electrically conductive signal trace and the electrically conductive ground plane both are formed on the surface.

23. A flexible, radio-frequency transition configured to electrically interconnect a first electronic component and a second electronic component to facilitate radio-frequency electrical communication therebetween, the transition comprising:

a flexible dielectric membrane; and a microstrip transmission line formed on the flexible dielectric membrane, wherein the microstrip transmission line includes an electrically conductive signal trace and an electrically conductive ground plane for the electrically conductive signal trace;

wherein the transition is configured to electrically interconnect the first electronic component and the second electronic component, and to permit radio-frequency electrical communication therebetween, throughout a range of transition angles;

wherein the transition includes a plurality of microstrip transmission lines that includes a plurality of electrically conductive signal traces and a plurality of electrically conductive ground planes, wherein each microstrip transmission line of the plurality of microstrip transmission lines includes a corresponding electrically conductive signal trace of the plurality of electrically conductive signal traces and a corresponding electrically conductive ground plane of the plurality of electrically conductive ground planes; and wherein the transition further includes a plurality of ground connections that electrically interconnect a central region of adjacent electrically conductive ground planes of the plurality of electrically conductive ground planes.

24. The transition of claim 23, wherein the plurality of ground connections and the plurality of electrically conductive ground planes are formed on a single surface of the flexible dielectric membrane.

* * * * *